(12) United States Patent
Lehrschall et al.

(10) Patent No.: US 7,827,307 B2
(45) Date of Patent: Nov. 2, 2010

(54) METHOD FOR FAST SWITCHOVER AND RECOVERY OF A MEDIA GATEWAY

(75) Inventors: Ronald W. Lehrschall, San Jose, CA (US); Xinfa J. Wu, Fremont, CA (US); Joseph R. Stone, San Jose, CA (US); Mychael Vo, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1020 days.

(21) Appl. No.: 10/954,946

(22) Filed: Sep. 29, 2004

(65) Prior Publication Data

US 2006/0075126 A1  Apr. 6, 2006

(51) Int. Cl.
*G06F 15/173* (2006.01)
*G06F 15/16* (2006.01)

(52) U.S. Cl. .................. 709/239; 709/224; 709/229

(58) Field of Classification Search .......... 709/229, 709/239, 224
See application file for complete search history.

(56) References Cited

U.S. PATENT DOCUMENTS

| | | | |
|---|---|---|---|
| 6,563,816 B1 * | 5/2003 | Nodoushani et al. | 370/352 |
| 6,614,781 B1 * | 9/2003 | Elliott et al. | 370/352 |
| 6,665,293 B2 * | 12/2003 | Thornton et al. | 370/352 |
| 6,765,916 B1 | 7/2004 | Duvvuru et al. | 370/395.5 |
| 6,799,210 B1 * | 9/2004 | Gentry et al. | 709/223 |
| 6,882,653 B1 * | 4/2005 | Kiuchi et al. | 370/401 |
| 6,965,558 B1 * | 11/2005 | Hann | 370/216 |
| 7,031,264 B2 * | 4/2006 | Adhikari et al. | 370/252 |
| 7,209,473 B1 * | 4/2007 | Mohaban et al. | 370/352 |
| 7,286,467 B1 * | 10/2007 | Sylvain | 370/216 |
| 7,313,098 B2 * | 12/2007 | Bearden et al. | 370/252 |
| 7,359,751 B1 * | 4/2008 | Erickson et al. | 607/27 |
| 7,433,362 B2 * | 10/2008 | Mallya et al. | 370/408 |
| 2002/0184554 A1 * | 12/2002 | McKenzie et al. | 714/4 |
| 2004/0042485 A1 * | 3/2004 | Gettala et al. | 370/465 |
| 2005/0073998 A1 * | 4/2005 | Zhu et al. | 370/352 |
| 2005/0083844 A1 * | 4/2005 | Zhu et al. | 370/230.1 |

* cited by examiner

*Primary Examiner*—William C Vaughn, Jr.
*Assistant Examiner*—Umar Cheema
(74) *Attorney, Agent, or Firm*—Stolowitz Ford Cowger LLP

(57) ABSTRACT

A device and method for fast switchover and recovery of a media gateway. A network interface of a router is monitored for a network interface failure, in which the router receives data over a network using a network protocol. In response to detecting a network interface failure, the network interface failure is translated into a gateway protocol understood by the media gateway. The network interface failure is transmitted to the media gateway using the gateway protocol over a primary path, providing for fast switchover time to a redundant path by the media gateway.

27 Claims, 4 Drawing Sheets

METHOD FOR FAST SWITCHOVER AND RECOVERY OF A MEDIA GATEWAY

FIELD OF INVENTION

The present invention relates to the field of voice over Internet protocol (VoIP) communication including voice, video and data. Specifically, the present invention relates to achieving high-availability through redundant network interfaces and a device and method for propagating a network interface failure to decomposed media gateway.

BACKGROUND OF THE INVENTION

The two-way transmission of voice, video and data over a packet-switched IP network is referred to as VoIP or IP telephony. VoIP is sensitive to delays and packet loss due to the time-sensitive nature of voice traffic. Therefore, it is important that the network carrying VoIP traffic is resilient to failures, such as network interface failures.

In a particular service provider environment, VoIP is provided over a decomposed architecture. The decomposed architecture includes a number of media gateways that provide an interface to a phone network and an IP network, such as a public switched telephone network (PSTN) and the Internet. The media gateways are connected to a number of IP routers over through asynchronous transfer mode (ATM) virtual circuits (VCs), in which the IP routers are connected to an IP network.

This VoIP architecture provides for additional protection against failure by providing multiple IP routers. However, in the event of an IP network interface failure, a media gateway has no way of receiving notice of the failure. For example, in the event of a network interface failure, the media gateway would continue to forward traffic to the router involving the network interface failure. This is undesirable because there is a disconnection in the traffic which, if it lasts for too long (typically greater than three seconds) results in one or both of the parties terminating the call.

SUMMARY OF THE INVENTION

Various embodiments of the present invention, a device and method for fast switchover and recovery of a media gateway, are described. In one embodiment, an IP network interface of a router is monitored for a network interface failure, in which the router receives data over an IP network. In response to detecting a network interface failure, the network interface failure is translated into an asynchronous transfer mode (ATM) protocol understood by the media gateway. The network interface failure is transmitted to the media gateway using the ATM protocol over a virtual circuit (VC).

In another embodiment, the present invention provides a physically decomposed media gateway. A media gateway is operable to receive communications using an ATM protocol. The ATM VCs connecting the media gateway and the IP routers are for communicating with the media gateway using the ATM protocol. A plurality of routers coupled to the ATM VCs are for communicating with the media gateway and coupled to an IP network at a network interface. At least one router of the plurality of routers is operable to communicate over the network. The router is operable to monitor the network interface for a network interface failure, is operable to translate the network interface failure into an ATM protocol, and to transmit the network interface failure to the media gateway using an ATM protocol over a VC.

In another embodiment, the present invention provides a router. The router includes a processor, a memory unit coupled to the processor, at least one input/output port coupled to the processor for coupling the router to an electronic device and for supporting communication between the router and the electronic device using a first protocol, and at least one network interface coupled to the processor for coupling the router to a network and for supporting communication between the router and the network using a second protocol. The router also includes an interface monitor for monitoring for a failure at the network interface, for translating the failure from the second protocol into the first protocol, and for communicating the failure to the electronic device using the first protocol.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
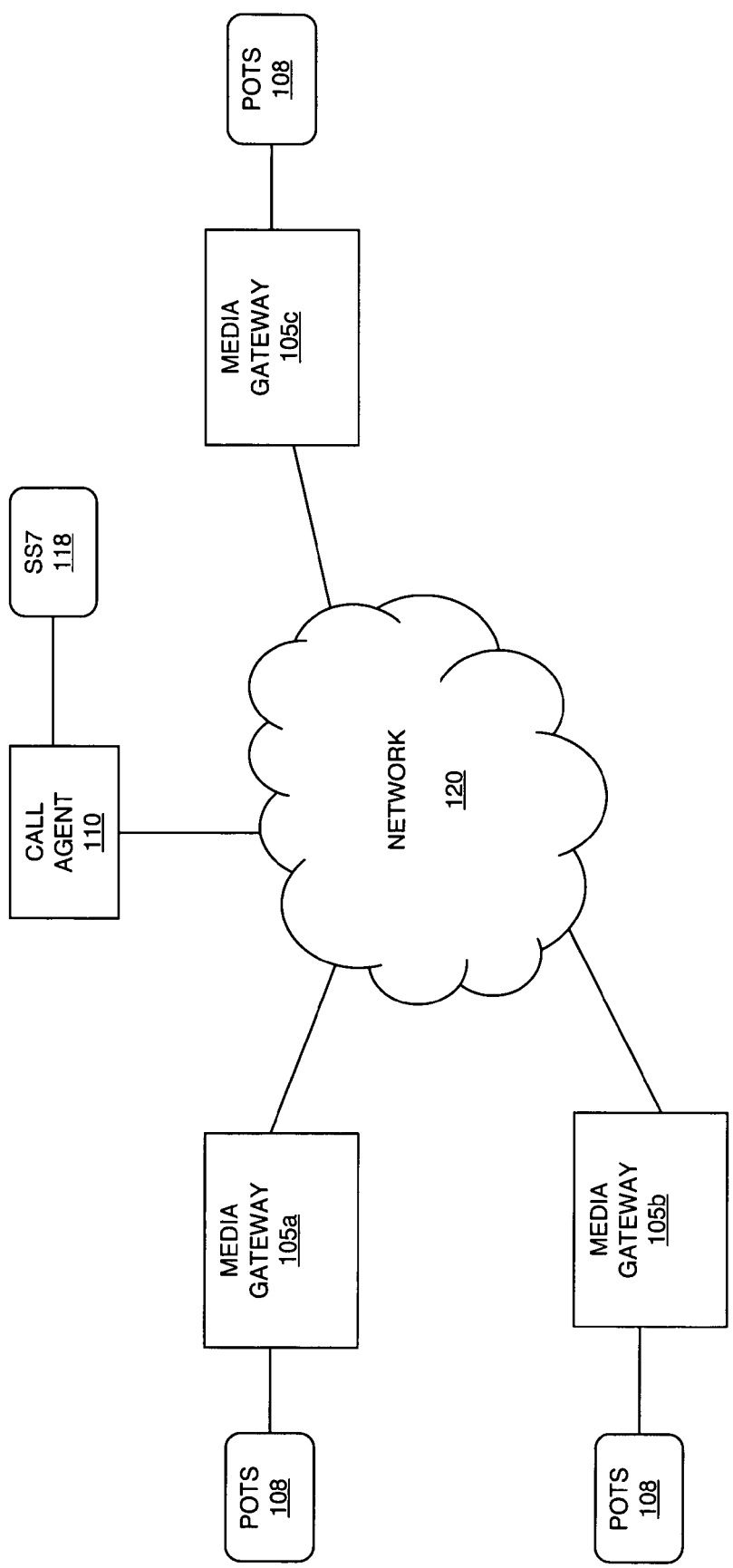
FIG. 1 is a block diagram of an exemplary network for supporting multimedia traffic, in accordance with an embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Various embodiments of the present invention a device and method for fast switchover and recovery of a media gateway supporting multimedia over Internet protocol are described herein. Embodiments of the present invention provide for monitoring an IP network interface of a router for a network interface failure, in which the router receives data over an IP network. In response to detecting a network interface failure, the network interface failure is translated into an ATM protocol understood by the media gateway. The network interface failure is transmitted to the media gateway using the ATM protocol over a VC.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "monitoring", "detecting", "receiving", "translating", "transmitting", "switching", or the like, refer to the actions and processes of a computer system or similar electronic computing device. The computer system or similar electronic device (e.g., a router or a media gateway) manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

FIG. 1 is a block diagram of an exemplary network 120 for supporting multimedia over Internet protocol (e.g., real-time voice, video and data) and voice of Internet protocol (VoIP) traffic, in accordance with an embodiment of the present invention. Network 120 is a core network that supports packetized traffic. In one embodiment, network 120 is an Internet protocol (IP) network. Network 120 is communicatively coupled to at least one media gateway through a plurality of IP routers (not shown) for providing VoIP functionality. It should be appreciated that network 120 may be communicatively coupled to one or more media gateways, and is not limited to the illustrated embodiment.

Media gateways 105a-c are communicatively coupled to electronic devices or systems for handling the received data. In one embodiment, media gateways 105a-c are communicatively coupled to plain old telephone systems (POTS) 108 for providing access to telephone receivers. POTS 108 may be a public switch telephone network (PSTN), an advanced intelligent network (AIN), an advanced mobile phone service (AMPS), or any other network or system for providing multimedia communication. In another embodiment, media gateways 105a-c are communicatively coupled to computer systems capable of handling received multimedia data.

In one embodiment, network 120 is also communicatively coupled to at least one call agent 110 for controlling media gateways 105a-c. Call agent 110 receives signaling from a telephone network using a protocol such as signaling system 7 (SS7) 118. Call agent 110 is operable to translate control information from the telephone network protocol (e.g., SS7) into a protocol communicated to the appropriate media gateways 105a-c, thereby directing media gateways 105a-c how to route telephone calls. It should be appreciated that network 120 may not be communicatively coupled to a call agent. The telephone call route may be statically provisioned.

Figure 2:
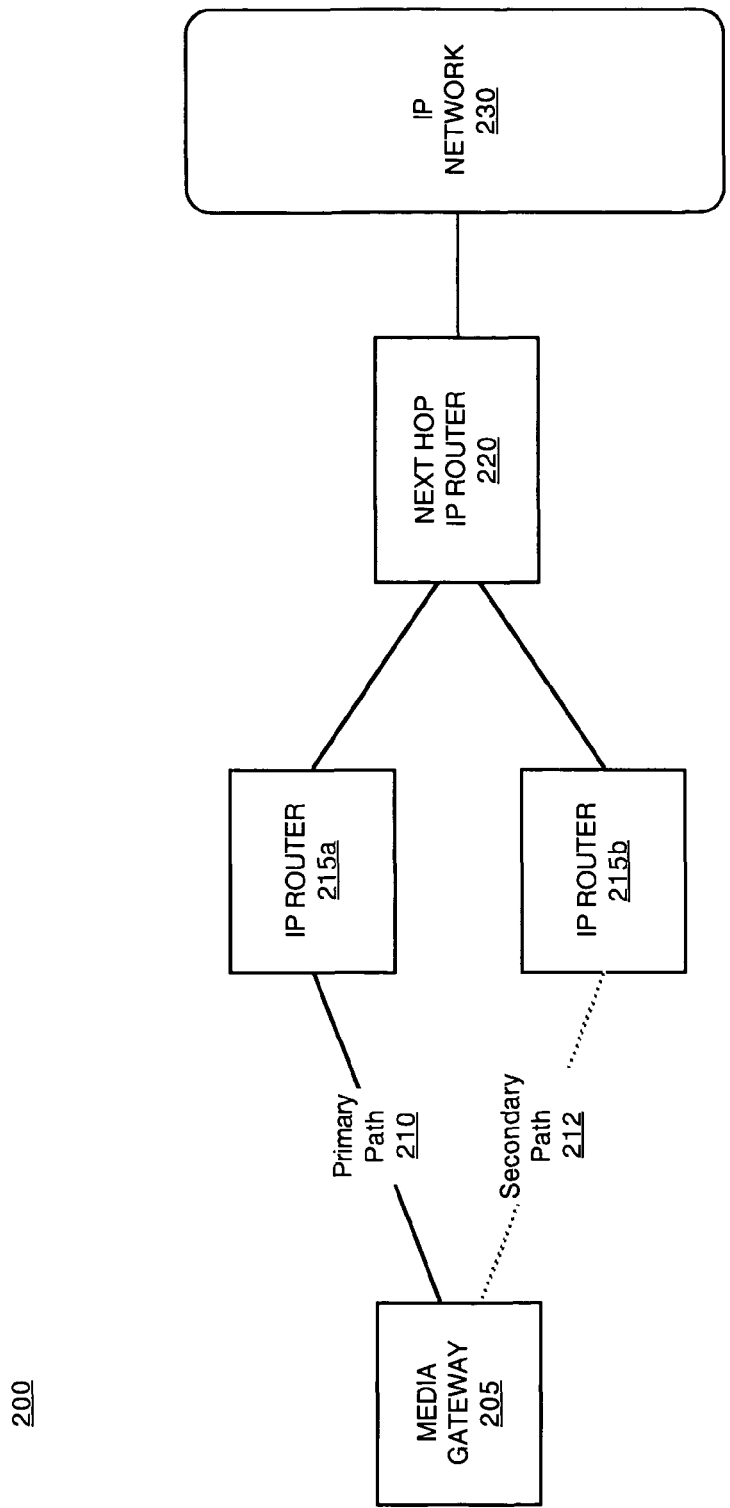
FIG. 2 is a block diagram of a physically decomposed media gateway, in accordance with an embodiment of the present invention.

FIG. 2 is a block diagram of a physically decomposed media gateway, in accordance with an embodiment of the present invention. Media gateway 205 is communicatively coupled to IP router 215a over primary path 210 and to IP router 215b over secondary path 212. IP routers 215a and 215b are both communicatively coupled to next-hop IP router 220, which is coupled to IP network 230. It should be appreciated that IP network 230 may include next-hop IP router 220.

In one embodiment, media gateway 205 is communicatively coupled to POTS for providing access to telephone sets. Media gateway 205 is operable to convert the digital signaling transmitted over network 230 into an audio signal (e.g., a voice) that can be listened to and understood by a user. Also, media gateway 205 is operable to convert audio information (e.g., spoken words) into a digital signal for transmission over network 230 to another user. Media gateway 205 does not include intelligence for routing calls over network 230. In another embodiment, media gateway 205 is communicatively coupled to a computer system for handling received media data, e.g., real-time voice, video and data.

Routers 215a and 215b provide IP routing capability for media gateway 205 for routing media traffic to and from network 230. In one embodiment, routers 215a and 215b are IP routers. Media gateway 205 is communicatively coupled to routers 215a and 215b over primary path 210 and secondary path 212, respectively. In other words, for every path there is a redundant path. In one embodiment, primary path 210 and secondary path 212 are asynchronous transfer mode (ATM) virtual circuits (VCs). Accordingly, there is one primary ATM VC and one secondary ATM VC corresponding to each media gateway.

Figure 3:
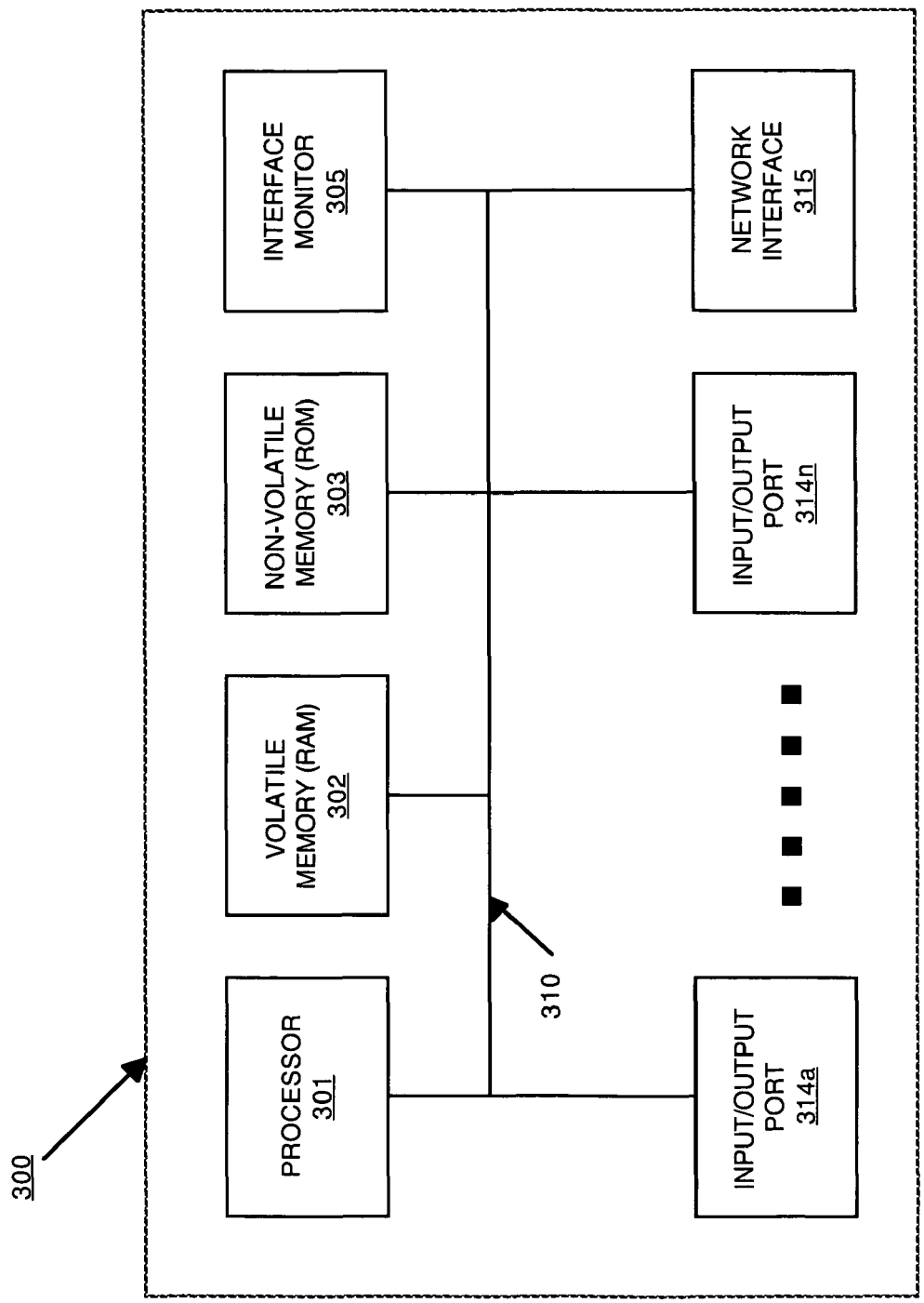
FIG. 3 is a block diagram of a router, in accordance with an embodiment of the present invention.

FIG. 3 is a block diagram of an exemplary router 300 in accordance with an embodiment of the present invention. In one embodiment, router 300 is an IP router. In general, router 300 comprises bus 310 for communicating information, processor 301 coupled with bus 310 for processing information and instructions, random access (volatile) memory (RAM) 302 coupled with bus 310 for storing information and instructions for processor 301, and read-only (non-volatile) memory (ROM) 303 coupled with bus 310 for storing static information and instructions for processor 301. Furthermore, router 300 includes at least one input/output (I/O) ports 314a-n used to couple router 300 to, for example, a media gateway (e.g., media gateway 205 FIG. 2), and at least one network interface 315 for coupling router 300 to, for example, a core network.

Router 300 also includes interface monitor 305 for monitoring network interface 315. Interface monitor 305 tracks the interfaces connected to, for example, the core network and notifies the media gateways of an interface or line failure. This notification directs the media gateway to use the redundant path through the ATM VCs to another router for egress traffic. In one embodiment, interface monitor 305 tracks network interface 315 using the protocol used in communication between router 300 and the network (e.g., the network protocol). The network protocol may be Ethernet, packet over SONET, file distributed data interface (FDDI), gigabit (GB) Ethernet, a proprietary protocol, or any other protocol. When a failure is detected at the network interface, the failure notification is translated into the ATM protocol used in communication between router 300 and the media gateway, also referred to as the gateway protocol. It should be appreciated that the gateway protocol may be ATM, a proprietary protocol, or any other protocol. Interface monitor 305 propagates the translated failure notification to the media gateway, enabling the media gateway to switch to a redundant path. In one embodiment, the detection time for interface monitor 305 is less than one second.

With reference to FIG. 2, in one embodiment, router 215a operates as a primary router and router 215b operates as a secondary router which is used to resume routing functions in the event of primary router failing. The secondary router terminates the redundant path (secondary path 212) corresponding to media gateway 205. In the case of a failure of a primary router, the secondary router will resume routing the traffic from the corresponding media gateway.

In one embodiment, the present invention provides improved switchover times by combining dynamic and static routing to improve routing convergence for ingress traffic. Primary path 210 through an ATM VC between media gateway 205 and router 215a is advertised via the dynamic routing protocol. Secondary path 212 through an ATM VC between media gateway 205 and router 215b is not advertised by the dynamic routing protocol, but floating static routes are used. In one embodiment, next-hop IP router 220 would have a static route to the redundant path. In one embodiment, next-hop IP router 220 uses router 215a for ingress traffic determined by dynamic routing protocol. In the event of router 215a failure, next-hop IP router 220 uses router 215b for ingress traffic determined by static routing protocol. This allows fast IP convergence because the static route for a given network is always available in the case of a failure and the dynamic routing protocol needs time to re-converge. Also, upon failure recovery the convergence time required for the dynamic routing protocol to form neighbor relationships and repopulate the routing table is eliminated. In one embodiment, by propagating network interface failures to media gateway 205, along with the combination of dynamic and static routing, routers 215a and 215b are able to recover in less than one second.

In one embodiment, the present invention is implemented in a decomposed VoIP architecture in which the physically decomposed media gateway is controlled by an external call control element. The inter-connections between the media gateways and IP routers are ATM VCs. The IP routers are connected to the core IP network via GB Ethernet links.

In one embodiment, each primary ATM PVC is protected by a secondary PVC. The secondary PVC is connected to an active secondary IP router. The dual PVCs (primary and secondary) between the media gateways and IP routers uses ATM operation, administration, and maintenance (OAM) loopback cells to test the integrity of the PVCs or operational status of a given IP Router.

With reference to FIG. 2, in accordance with one embodiment of the present invention, core IP network (e.g., network 230) failures are propagated to media gateway 205 according to the following example. Router 215a responds to ATM OAM loopback cells while the GB Ethernet interface/line is up. Router 215a does not respond ATM OAM loopback cells while the GB Ethernet interface/link is down. When the GB Ethernet interface/link transitions from failed to active, media gateway 205 should wait for the GB Ethernet interface to come up before responding to ATM OAM loopback cells to ensure the interface is fully initialized. In one embodiment, this is a configurable feature on router 215a. The suppression of the OAM loopback cells will cause media gateway 205 to switch to the secondary PVC in less than one second. In one embodiment, the IP subnet of the primary PVCs terminating on the routers 215a and 215b are advertised to a dynamic routing protocol through router 215a, but the secondary PVCs are not advertised. Routing to the secondary PVCs is accomplished through floating static routes and is only used during failure conditions.

Figure 4:
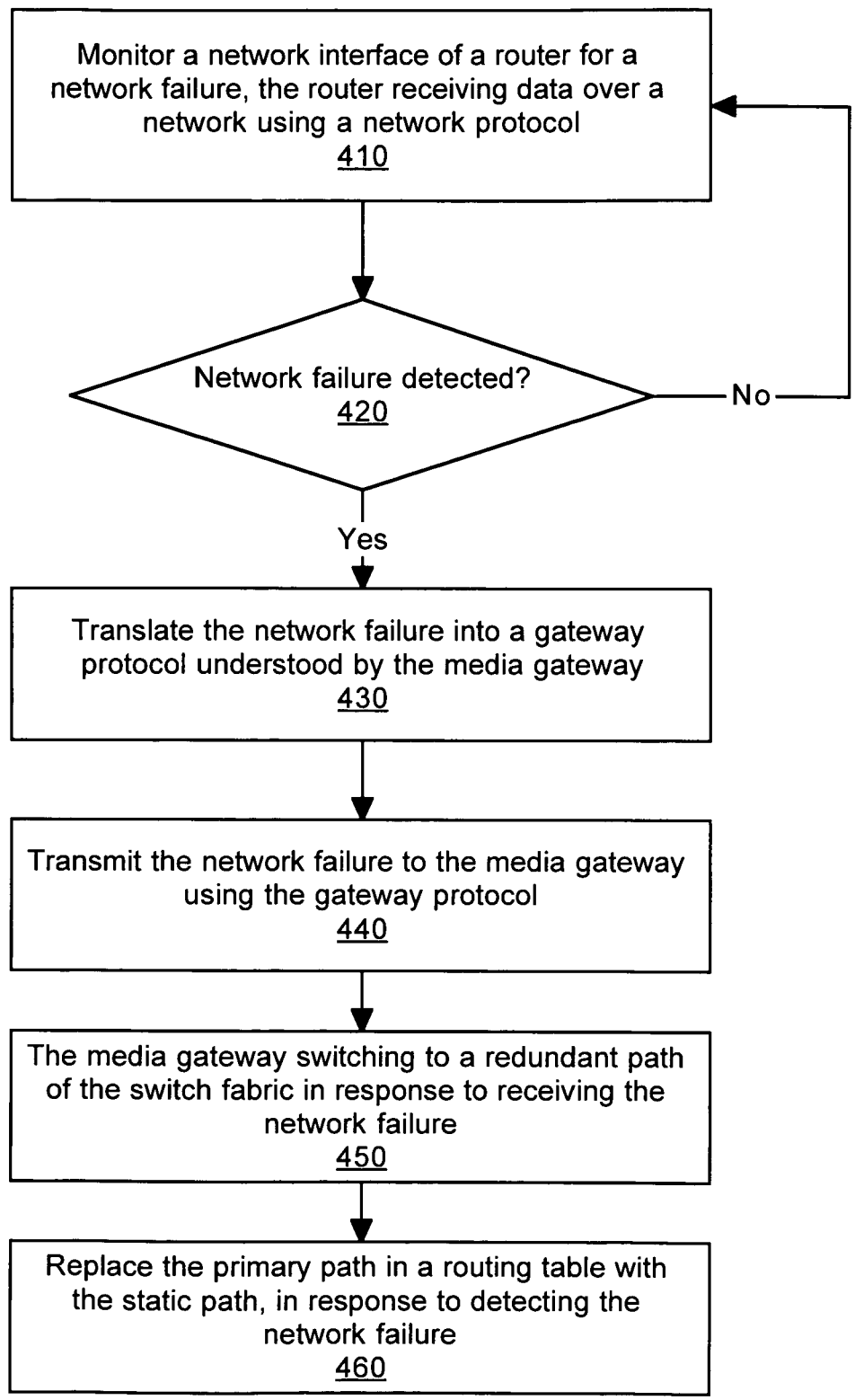
FIG. 4 is a flow chart illustrating a process for propagating a network interface failure to a media gateway, in accordance with one embodiment of the present invention.

FIG. 4 is a flow chart illustrating a process 400 for propagating a network interface failure to a media gateway of a decomposed media gateway, in accordance with one embodiment of the present invention. In one embodiment, process 400 is carried out by processors and electrical components under the control of computer readable and computer executable instructions. The computer readable and computer executable instructions reside, for example, in data storage features such as computer usable volatile and non-volatile memory (e.g., volatile memory 302 and non-volatile memory 303 of FIG. 3). However, the computer readable and computer executable instructions may reside in any type of computer readable medium. Although specific steps are disclosed in process 400, such steps are exemplary. That is, the embodiments of the present invention are well suited to performing various other steps or variations of the steps recited in FIG. 4. In one embodiment, process 400 is performed by router 300 of FIG. 3.

At step 410 of process 400, a network interface of a router is monitored for a network interface failure (e.g., network interface 315 of router 300 of FIG. 3). The router is configured to receive data over the network using a network protocol. In one embodiment, the network protocol is an Ethernet protocol.

At step 420 it is determined if a network interface failure is detected. If a network interface failure is not detected, process 400 continues to monitor the network interface as described at step 410. Alternatively, if a network interface failure is detected, the network interface failure is translated into a gateway protocol understood by the media gateway, as shown at step 430. In one embodiment, the gateway protocol is an ATM protocol. In one embodiment, the media gateway supports VoIP functionality. In one embodiment, the media gateway does not support direct routing to the network.

At step 440, the network interface failure is transmitted to the media gateway using the gateway protocol. In one embodiment, the network interface failure is transmitted over a primary path ATM VC. At step 450, the media gateway switches to a redundant path ATM VC in response to receiving the network interface failure. In one embodiment, the redundant path is a static route. In one embodiment, the primary path is dynamic route advertised over dynamic routing protocol. At step 460, in one embodiment of the present invention, the primary path in a routing table of a next-hop router is replaced with the static path, in response to detecting the network interface failure.

The described embodiments of the present invention provide a device and method for propagating a network interface failure to a media gateway of a decomposed VoIP media gateway. By monitoring for a network interface failure at a network interface, and propagating the network interface failure to the media gateway, the described embodiments provide fast switchover and recovery for media gateways and routers as: part of an architecture providing conversion between media (voice, data, fax and etc.) packets carried over a core IP network. Moreover, the described invention provides high availability in a VoIP solution with minimal development time and effort and provides for less than one second recovery time for any router failure or network interface failure within the architecture.

Various embodiments of the present invention, a device and method for fast switchover and recovery of a media gateway, are thus described. While the present invention has been described in particular embodiments, it should be appreciated that the present invention should not be construed as limited by such embodiments, but rather construed according to the below claims.

What is claimed is:

1. A method for fast switchover and recovery of a media gateway, said method comprising:

continuously monitoring a network interface of a first local router for a network interface failure, wherein said first local router is configured to receive media data over a network using a network protocol, and wherein said first local router is communicatively coupled to said media gateway over a primary data path, wherein the primary data path is associated with a redundant path;

wherein the continuously monitoring comprises actively testing local access to the network through the network interface by sending polling packets to the network interface and waiting a predetermined time period for a response to the polling packets;

responsive to an absence of a response to the polling packets within the time period detecting a network interface failure at said network interface indicating inoperability of local communication with the network through the network interface independently of data being transferred between the first local router and the media gateway;

generating a network interface failure notification message, wherein the notification message directs the media gateway to use the associated redundant path to a second router for egress traffic;

translating said network interface failure notification message from said network protocol into a media gateway protocol understood by said media gateway and different than said network protocol, in response to detecting said network interface failure; and transmitting said network interface failure notification message from said first local router to said media gateway using said gateway protocol over said primary data path, wherein responsive to said network interface failure notification message said media gateway switches over to the associated redundant path communicatively coupling said media gateway to the second router configured to receive said media data over said network using said network protocol, wherein said primary data path corresponds to a dynamic route advertised over a dynamic routing protocol wherein the dynamic route requires time for reconvergence, and wherein said redundant path corresponds to an unadvertised static route wherein the static route is always available for IP convergence and wherein using the static route eliminates the time required for dynamic router reconvergence.

2. The method of claim 1 further comprising replacing said primary data path in a routing table with a static path, in response to detecting said network interface failure.

3. The method of claim 1, wherein said network protocol is an Ethernet protocol.

4. The method of claim 1, wherein said gateway protocol is an asynchronous transfer mode (ATM) protocol.

5. The method of claim 1, wherein said media gateway supports multimedia over Internet protocol functionality.

6. The method of claim 1, wherein said media gateway does not support direct routing to said network.

7. A multimedia gateway comprising: a media gateway operable to receive communications from one or more routers using a gateway protocol; a first router communicatively coupled to said media gateway over a primary path for communicating with said media gateway using said gateway protocol, wherein said first router is further coupled to a network at a network interface of said first router, wherein said first router is operable to monitor said network interface for a network interface failure, wherein said first router is operable to translate said network interface failure from a network protocol into said gateway protocol, and wherein said first router is further operable to transmit said network interface failure to said media gateway using said gateway protocol over said primary path; and a second router communicatively coupled to said media gateway over a secondary path, wherein said media gateway switches to said secondary path in response to receiving said network interface failure over said primary path, wherein said primary path corresponds to a dynamic route advertised over dynamic routing protocol, and wherein said secondary path corresponds to a static route that is not advertised by said dynamic routing protocol;

wherein said first router and said second router are locally coupled to a next-hop router of said network through a primary path connection and a static path connection, respectively, said next-hop router being configured to update a routing table of said next-hop router in response to notification of said network interface failure by replacing said primary path connection in said routing table with said static path connection for ingress data being routed by the next-hop router toward the media gateway.

8. The multimedia gateway of claim 7, wherein said media gateway supports multimedia over Internet protocol functionality.

9. The multimedia gateway of claim 7, wherein said media gateway does not support direct routing to said network.

10. A non-transitory computer-usable medium having computer-readable program code embodied therein, wherein when said computer-readable program code is executed by at least one computer, said computer-readable program code is operable to:

continuously monitor a network interface of a first local router for a network interface failure, wherein said first local router is configured to receive data over a network using a network protocol, and wherein said first local router is communicatively coupled to a media gateway by a primary data path, wherein the primary path is associated with a redundant path;

wherein the continuously monitoring comprises actively testing local access to the network through the network interface by sending polling packets to the network interface and waiting a predetermined time period for a response to the polling packets;

detect a network interface failure at said network interface, responsive to an absence of a response to the polling packets within the time period, the absence of a response to the polling packets indicating inoperability of local communication with the network through the network interface; generating a network interface failure notification message, wherein the notification message directs the media gateway to use the associated redundant path to a second router for egress traffic; translate said network interface failure notification message from said network protocol into a gateway protocol understood by said media gateway wherein said gateway protocol is different than said network protocol; and transmit said network interface failure notification message to said media gateway using said gateway protocol over said primary path wherein responsive to said network interface failure notification message said media gateway switches over to the associated redundant path communicatively coupling said media gateway to the second router, wherein said second router is configured to receive data over said network using said network protocol, wherein said primary path corresponds to a dynamic route advertised over dynamic routing protocol and wherein the dynamic route requires more time for reconvergence than an unadvertised static route corresponding to the redundant path wherein the static route is available for IP convergence and wherein using the static route reduces the time required for reconvergence relative to using the dynamic route.

11. The non-transitory computer-usable medium of claim 10, wherein said computer-readable program code is further operable to replace said primary path in a routing table with said static route, in response to detecting said network interface failure.

12. The non-transitory computer-usable medium of claim 10, wherein said media gateway supports voice over Internet protocol (VoIP) functionality.

13. The non-transitory computer-usable medium of claim 10, wherein said media gateway does not support direct routing to said network.

14. A router comprising:
a processor;
a memory unit coupled to said processor;
at least one input/output port coupled to said processor for coupling said router to an electronic device and for supporting communication between said router and said electronic device using a first protocol;
at least one network interface other than said input/output port coupled to said processor for coupling said router to a network and for supporting communication between said router and said network using a second protocol; and
an interface monitor for continuously monitoring for a failure at said network interface, for generating a failure message; for translating said failure message from said second protocol into said first protocol, for propagating through said router said network interface failure from said network interface of said router to said input/output port of said router, and for communicating said translated and propagated failure from said input/output port to said electronic device using said first protocol;
wherein said network interface is for locally coupling said router to a next-hop router of said network through a primary path connection and a static path connection, respectively, said next-hop router being configured to update a routing table of said next-hop router in response to notification of said failure by replacing said primary path in said routing table with said static path for ingress data being routed by the next-hop router toward a media gateway.

15. The router of claim 14, wherein said electronic device is a media gateway.

16. The router of claim 14, wherein a first input/output port is for coupling said router to said electronic device over a primary path and wherein a second input/output port is for coupling said router to said electronic device over a redundant path.

17. The router of claim 16, wherein said redundant path corresponds to a static route.

18. The router of claim 15, wherein said primary path corresponds to a dynamic route advertised over dynamic routing protocol.

19. The method of claim 1, further comprising propagating said network interface failure from said network interface of said first router to an input/output port of said first router other than said network interface.

20. The method of claim 1, further comprising reestablishing said primary path for transmitting media data after a dynamic routing protocol convergence time.

21. The method of claim 20, wherein upon receiving said network interface failure said media gateway switches over to a secondary path without waiting for said dynamic routing protocol convergence time.

22. The method of claim 20 wherein said actively testing further comprises testing said dynamic routing protocol convergence time by using asynchronous transfer mode (ATM) loopback cells to test an operational status of said first router.

23. The method of claim 22, wherein said first router does not respond to said ATM loopback cells when said network failure is detected.

24. The method of claim 22, further comprising monitoring when said network interface is restored before responding to said ATM loopback cells.

25. The multimedia gateway of claim 7, wherein said first router is further operable to propagate said network interface failure from said network interface of said first router to an input/output port of said first router, and wherein said network interface is located at a different port of said first router.

26. The multimedia gateway of claim 7, wherein said network protocol is an Ethernet protocol, and wherein said gateway protocol is an asynchronous transfer mode (ATM) protocol.

27. The non-transitory computer-usable medium of claim 10, wherein said computer-readable program code is further operable to propagate said network interface failure from said network interface of said first router to an input/output port of said first router other than said network interface.

* * * * *

UNITED STATES PATENT AND TRADEMARK OFFICE
CERTIFICATE OF CORRECTION

| | | |
|---|---|---|
| PATENT NO. | : 7,827,307 B2 | |
| APPLICATION NO. | : 10/954946 | |
| DATED | : November 2, 2010 | |
| INVENTOR(S) | : Lehrschall et al. | |

It is certified that error appears in the above-identified patent and that said Letters Patent is hereby corrected as shown below:

At column 8, line 56, please replace "media gateway" with --media gateway,--.
    At column 8, line 60, please replace "primary path" with --primary path,--.

Signed and Sealed this
Fourth Day of October, 2011

David J. Kappos
*Director of the United States Patent and Trademark Office*